Sept. 22, 1959     H. M. MARTIN ET AL     2,905,863
SIGNAL FLARES
Filed July 17, 1957     3 Sheets-Sheet 1
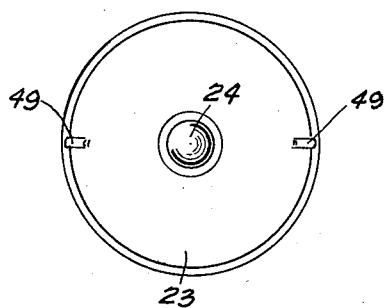
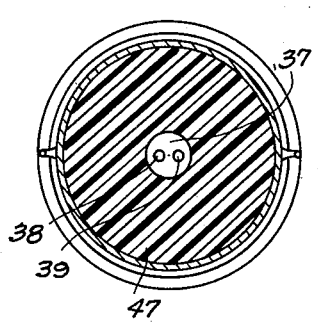
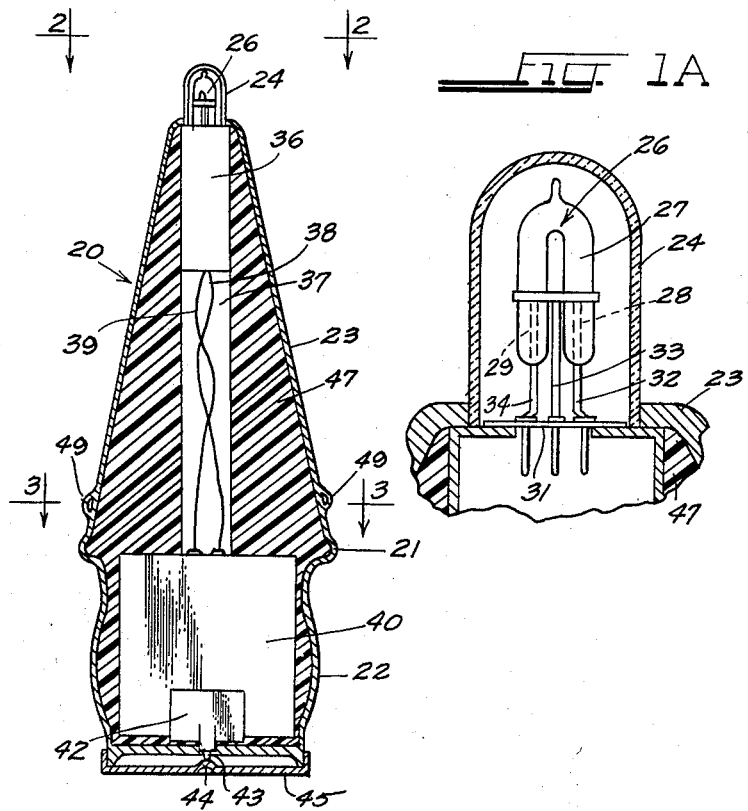
INVENTORS
HARRY M. MARTIN
DAVID H. RUSH
BY
*Wallace and Cannon*
Attys.

Sept. 22, 1959  H. M. MARTIN ET AL  2,905,863
SIGNAL FLARES

Filed July 17, 1957  3 Sheets-Sheet 2

INVENTORS
HARRY M. MARTIN
DAVID H. RUSH
BY
Wallace and Cannon
ATT'YS.

Sept. 22, 1959     H. M. MARTIN ET AL     2,905,863
SIGNAL FLARES
Filed July 17, 1957     3 Sheets-Sheet 3
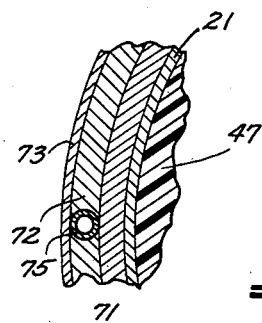
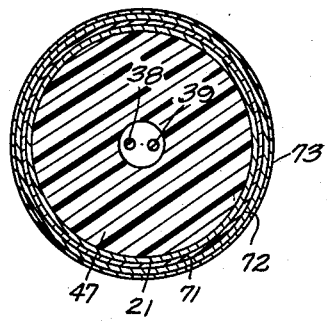
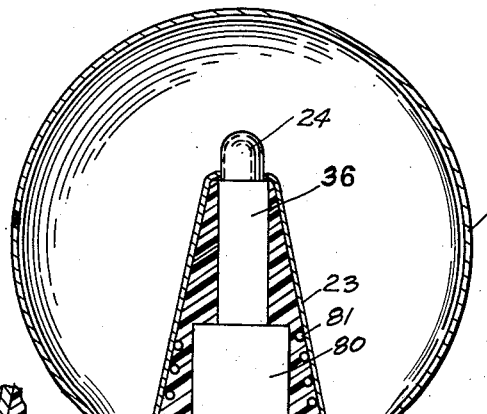
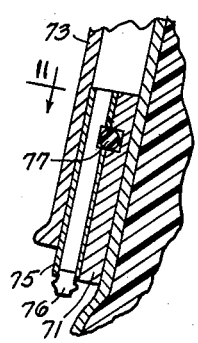
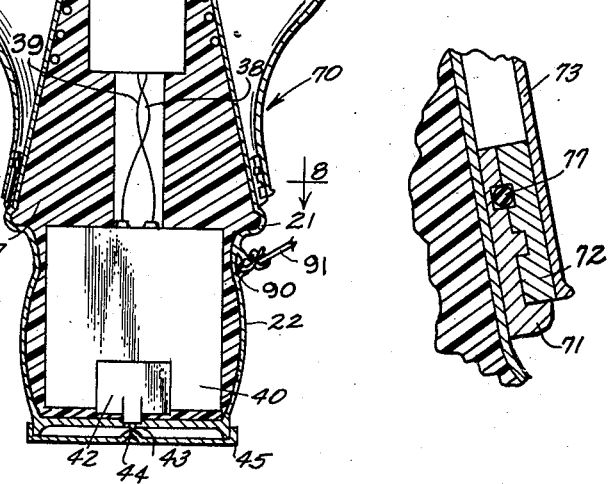
INVENTORS
HARRY M. MARTIN
DAVID H. RUSH
BY
*Wallace and Cannon*
Attys.

United States Patent Office 2,905,863
Patented Sept. 22, 1959

2,905,863

SIGNAL FLARES

Harry M. Martin, Fort Lauderdale, Fla., and David H. Rush, Belle Harbor, N.Y., assignors to Rescue Lite Inc., Fort Lauderdale, Fla., a corporation of Florida Application July 17, 1957, Serial No. 672,392

11 Claims. (Cl. 315—183)

This invention relates to a new and improved signal flare. More particularly, the invention relates to a battery operated flare affording a high-level intense luminous signal for rescue and other emergency uses.

Many different types of distress signal devices have been proposed and employed for rescue and other emergency applications; typically, these signal flares have been utilized to indicate the location of accidents or of persons in distress. The mechanisms employed for this purpose have included, for example, chemical flares, electrically energized signal lamps, oil-burning flares, and the like. Many of these devices, however, may be detected only under relatively favorable weather conditions, since the light given off by the signal device is not intense enough to be detectable from a substantial distance in the presence of fog, rain, or other adverse conditions. Moreover, many of the signal flares previously utilized are undesirable for some applications in that they present definite explosion or fire hazards. A further difficulty, with respect to previously known electrical distress signal devices, is the frequent requirement for a non-portable power supply. In addition, the operating life of many of these known signal flares is quite limited, thus substantially reducing their value in rescue work whenever the search for the distressed persons extends over a substantial period of time.

The present invention relates to a new type of distress signal device adapted for use in situations in which the device may be required to operate over substantial periods of time. The invention is primarily intended as a marker to be employed in rescue work and may be utilized by sailers, airplane pilots, truck and other vehicle operators, campers, hunters, and other parties who may have a use for a signal flare of this kind. The signal device of the invention is also suitable for use as a highway marker for accidents, as a school zone marker, as a marker for dangerous intersections, open trenches, or other hazardous objects or conditions. The signal flare may also be employed as an emergency runway marker, a taxi area indicator, or in other similar situations. In general, the signalling device of the invention is suitable for use in any situation in which an intense warning signal is necessary or desirable.

A primary object of the invention, therefore, is a new and improved signal flare affording an intense luminous signal over a substantial period of time.

A more specific object of the invention is a new and improved signal flare which affords a high-level intermittent luminous signal over an extended period of time without requiring any particular care or attention.

Another object of the invention is a new and improved self-contained signal flare which provides a high-level luminous signal but which presents no explosion or fire hazard.

A corollary object of the invention is a new and improved signal flare which affords a radio frequency signal in addition to a high-level luminous signal.

A further object of the invention is a new and improved high-level luminous signal flare which is simple and economical in construction yet is adapted for use in a wide variety of environments and under extreme changes in weather conditions.

A signal flare constructed in accordance with the inventive concept comprises a battery, a high-output flashtube, and circuit means interconnecting the battery and the flashtube for automatically intermittently completing an electrical circuit from the battery to the flashtube to energize the flashtube. The signal flare further comprises a housing of shock-resistant water-impervious material encompassing the battery, the flashtube, and the circuit means; that portion of the housing which encompasses the flashtube must of course be of light-transmissive material, either transparent or translucent. An actuating switch is mounted within the housing and is electrically connected to the aforementioned circuit means to disable the circuit means and prevent operation of the flare until that switch is closed. The switch is provided with an actuating member which is accessible externally of the housing to afford a means for actuating the flare. In addition, a shock-absorbing packing is interposed between the housing and the operating components of the flare; preferably, this packing comprises a relatively light shock-resistant material such as a foamed plastic.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention and the purview of the appended claims.

In the drawings:

Fig. 1 is a sectional elevation view of a signal flare constructed in accordance with one embodiment of the invention;

Fig. 1A is an enlarged detail view showing a typical light source which may be incorporated in the flare of Fig. 1;

Fig. 2 is a plan view of the flare taken as indicated by line 2—2 in Fig. 1;

Fig. 3 is a sectional view of the flare of Fig. 1 taken along line 3—3 therein;

Fig. 7 is a sectional elevation view of another embodiment of the invention;

Fig. 8 is a sectional view of the embodiment of Fig. 7 taken along line 8—8 therein;

Fig. 9 is an enlarged detail view of a portion of the signal flare of Fig. 7;

Fig. 10 is an enlarged detail view, similar to Fig. 9, of the opposite side of the signal flare of Fig. 7; and Fig. 11 is a detail view, on an enlarged scale, taken along line 11—11 in Fig. 9.

Figure 6:
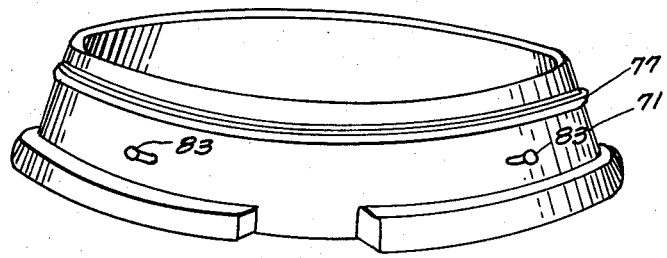
Fig. 6 is an enlarged detail view of a separable base member which may be fitted to the member illustrated in Fig. 5.

The signal flare 20 illustrated in Fig. 1 comprises a housing 21 having a base portion 22, an intermediate portion 23, and a top or dome portion 24. The base portion 22 is substantially cylindrical in configuration, whereas the intermediate portion 23 is of conical configuration. The housing 21 is fabricated from a shock-resistant water-impervious material and preferably should be substantially immune to corrosion and other forms of deterioration to humidity, heat, oxidation, and other environmental conditions which may be encountered in the use and storage of a distress signal device. The housing 21 may comprise an aluminum or other metal casing, including a steel casing if specially treated to prevent corrosion. Preferably, however, the housing 21 is fabricated from a plastic material or from other lightweight material not normally subject to corrosion or similar deterioration effects. One material which has been found to be very well suited for this purpose is fiberglass impregnated with a suitable resin binder or otherwise treated to render the housing waterproof.

The top portion 24 of the housing 21 is fabricated from a transparent plastic material or from other suitable material capable of transmitting light; this part of the housing may also be formed from a resin-impregnated fiberglass material. A high-output flashtube 26 is disposed within the top portion 24 of the flare housing, being located to radiate light outwardly through the transparent dome or cap of the flare. If the cap portion 24 of the flare housing is formed from a plastic material, the flashtube 26 may be completely embedded or "potted" in the plastic material of the housing. The flashtube 26 is preferably of the gas-filled type and affords an intense, high-level illumination. A number of different light sources of this kind suitable for use in the flare are manufactured by different lamp manufacturing companies; a typical flashtube suitable for this purpose is manufactured and sold by Sylvania Electric Products, Inc. of Salem, Massachusetts and is designated by them as their type R 4307 flashtube.

This particular light source, which is shown in enlarged detail in Fig. 1A, comprises a substantially U-shaped transparent envelope 27 having a cathode 28 and an anode 29 located in the two leg portions of the envelope. The flashtube 26 further includes a trigger electrode 30, the electrodes 28, 29 and 30 being connected to a pin-type base 31 by the leads 32, 33 and 34 respectively. The envelope 27 is filled with xenon and the light source operates as an arc-discharge device, the arc between the cathode 28 and the anode 29 being triggered by an electrical impulse applied to the trigger electrode 30. Several similar light sources are manufactured by this company and by others; for example, a substantially similar flashtube is manufactured by the General Electric Company under the model designated FT 106. These flashtubes are frequently employed as light sources for electronic flash camera attachments and are readily available commercially. The R 4307 flashtube requires an anode voltage of 175 to 750 volts and a trigger voltage of four kilovolts and affords a light output of approximately 1400 lumen-seconds for a period of approximately 280 micro-seconds.

The flashtube 26 is electrically connected to a flash circuit unit or chassis 36 which is mounted within the upper portion of the conical section 23 of housing 21. The chassis 36 is disposed within the upper end of a passageway 37 which extends vertically through the flare and through which a pair of electrical conductors 38 and 39 extend as indicated in Figs. 1 and 3. The circuit unit 36 comprises circuit means for automatically and intermittently completing an electrical circuit between the flashtube 26 and a battery 40 which is mounted within the base portion 22 of the signal flare housing, the conductors 38 and 39 comprising a part of this circuit means.

Figure 4:
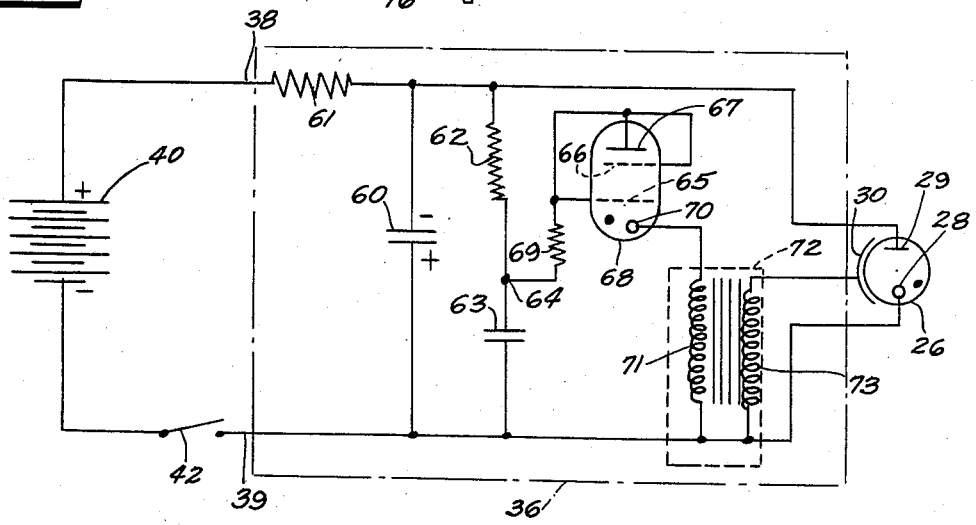
Fig. 4 is a schematic diagram of a typical electrical circuit which may be utilized in the signal flare of Fig. 1.

Usually, a battery affording about 500 volts output is desirable. A mercury cell battery is much preferred because of its extremely long shelf life; the circuit of Fig. 4 is intended for use with a battery of approximately 500 volts and 250 milliamperes output.

The battery 40 may comprise any suitable electrical storage device capable of providing the electrical energy for operating the flashtube 26 over an extended period of time; selection of the particular battery employed in the flare is to some extent dependent upon the operating characteristics of the flashtube and of the circuit means comprising the circuit unit 36.

The signal flare 20 further includes an actuating switch 42 which is mounted in the base portion 22 of the flare housing adjacent battery 40. The actuating switch 42 is electrically connected to the battery and other circuit means comprising chassis 36 and is utilized to disable the operating circuit for the flashtube 26 except when it is desired that the flare be placed in use. The switch 42 includes an actuating member comprising a plunger 43 which extends externally of the housing 21 at the base of the flare. The actuating plunger 43 is engaged by a projection 44 on a base member 45 which is removably secured to the base portion 22 of the flare housing. The base member 45 may be threaded to the base portion of the flare housing, may be secured thereto by bayonet lugs, wing nuts, or other suitable fasteners, or may be removably fastened to the flare by any convenient means which does not interfere with rapid actuation of the flare. Moreover, other similar switch actuation arrangements not requiring a removable base may be utilized if desired.

The flare 20 is also provided with a shock absorbing packing 47 which is interposed between the housing 21 and each of the operating components of the flare with the exception of the flashtube 26. This packing 47 should be fabricated from a relatively light weight material in order that the completed flare may be capable of floating on water. A typical packing which affords an excellent shock resistant structure is foamed polystyrene; if this material is used, the packing 47 may be fabricated as a plurality of blocks which may be fitted into the housing 23 to form a compact shock-resistant flare structure. The housing 21 of the flare may also be provided with a plurality of anchoring eyelets 49 or other anchoring means to afford a means for mooring the flare or for securing it in any desired position when in use. These mooring eyelets 49 are shown in Figs. 2 and 3 as well as in Fig. 1.

Operation of the signal flare illustrated in Figs. 1–3 and described hereinabove is extremely simple. As long as the base member 45 is secured to the flare housing 21, the switch actuating plunger 43 is depressed into the flare housing, keeping the actuating switch 42 opened. With the switch 42 opened, the flare is inoperative. As soon as it is desired to put the flare to use, the base member 45 is removed, releasing the switch plunger 43 and permitting the switch 42 to close. The closing of this switch, as will be explained more fully hereinafter in connection with Fig. 4, completes the electrical circuit from the battery 40 through the chassis or circuit unit 36 to the flashtube 26. The circuit unit 36 intermittently and automatically energizes the flashtube 26 from the battery 40 with the result that the flashtube 26 emits an extremely intense light signal which may be seen from very substantial distances even under adverse weather conditions. The flare may be anchored, while in use, at any suitable location by the mooring eyelets 49. On the other hand, the complete flare will float on water and may be released to float freely. The flare is capable of sustained operation over a period of one hundred hours or more, depending upon the frequency of light flashes, the battery used, and the rate of battery drain. The flashtube does not constitute a critical element in this regard.

To enhance the efficiency of the flare as a warning marker, the housing 21 of the device may be painted or otherwise coated with a fluorescent or phosphorescent coating. A coating of this kind makes the housing visible after dark even when the flare is not in operation, since the external coating glows continuously. This modification of the flare is particularly useful when the flare is to be stored at a remote location or in a poorly illuminated area where it may be necessary to find the flare and set it in operation in a minimum time in the event of emergency.

Fig. 4 illustrates a typical operating circuit which may be utilized in the signal flare of Fig. 1. As illustrated in this figure, and as described hereinabove, the battery 40 is connected to the flashtube 26 through the circuit unit 36 by means of the conductors 38 and 39, the switch 42 being interposed in series with the conductor 39. The circuit of Fig. 4 further includes a discharge capacitor 60 which is connected across the terminals of the battery 40, a current-limiting resistor 61 being interposed in the conductor 38 between the battery and the discharge capacitor. A series R-C circuit comprising a resistor 62 and a capacitor 63 is connected in parallel with the main discharge capacitor 60. The common terminal 64 of the resistor 62 and the capacitor 63 is connected to the control electrode 65, to the shield electrode 66, and to the anode 67 of a thyratron 68 through a resistor 69. The cathode 70 of the thyratron 68 is connected to one terminal of the primary winding 71 of a trigger transformer 72, the other terminal of the primary winding 71 being returned to the battery through the conductor 39. One terminal of the second winding 73 of the trigger transformer is connected to the trigger electrode 30 of the flashtube 26, the other terminal of the secondary winding being connected back to the conductor 39. The cathode 28 of the flashtube is connected to the negative battery terminal through the conductor 39, whereas the anode 29 of the flashtube is connected to the positive terminal of the battery through resistor 61 and conductor 38.

With properly selected components, the circuit of Fig. 4 affords an intermittent flashing light output of extreme intensity from the flashtube 26. The frequency of operation of the circuit is determined primarily by the values selected for the resistor 62 and the resistor 69. By way of illustration, but in no sense a limitation on the operating circuit, the following specific data for a typical circuit is provided:

*Discharge devices*

Light Source 26 _____ R 4307 flashtube.
Tube 68 _____ 6483 thyratron.

*Resistors*

61 _____ kilohms__ 100
62 _____ megohms__ 40
69 _____ megohm__ 1

*Capacitors*

60 _____ microfarads__ 50
63 _____ do____ 0.04

The trigger transformer employed in this circuit is somewhat similar to conventional transformers employed in stroboscopic flash units and similar applications but should be designed to afford a relatively high RF output. The frequency of the RF output is not critical; typically, it may be of the order of 150–200 kilocycles.

The particular circuit unit described in detail hereinabove affords an operating frequency, for the flare, of approximately 20 cycles per minute. The battery 40 charges the capacitor 60 and, when the charge on the capacitor reaches a predetermined threshold level, the thyratron 68 is ignited, discharging the capacitor through the path comprising the resistors 62 and 69, the thyratron discharge path, and the transformer primary 71. The resulting pulse applied to the primary of the trigger transformer generates an extremely high voltage impulse in the secondary winding 73 of the order of 4 kilovolts or greater. This high voltage impulse is of positive polarity as applied to the trigger electrode 30 and triggers the flashtube 26 into momentary operation. The flashtube remains in operation only for a relatively short interval, of the order of 280 micro-seconds. As soon as the capacitor 60 has been discharged, the thyratron 68 is extinguished, whereupon the capacitor 60 again starts to charge and the cycle is repeated. As indicated hereinabove, the frequency of operation of the flare circuit may be varied over a substantial range by varying the circuit impedance to change the breakdown level of the thyratron 68.

Figs. 5–10 illustrate a further embodiment of the invention particularly suited for use as a signal buoy. The signal flare 70 shown in Fig. 7 comprises a housing 21 having a base portion 22, an intermediate portion 23, and a top or dome portion 24 which are substantially similar to the corresponding designated portions of flare 20 of Fig. 1. Moreover, and as in the previous embodiment, the flare 70 includes a flashtube (not shown in Fig. 7) mounted within the dome 24 and an operating circuit unit 36 mounted within the upper portion of the conical part of the flare housing. A battery 40 is mounted in the base portion of the flare and an actuating switch 42 is mounted in the base of the flare with the actuating member or plunger 43 for the switch extending externally of the flare housing. As before, a base 45 is removably secured to the bottom part of the flare and includes a projection 44 which engages the actuating switch 42 normally to maintain the flare in inactive condition.

Figure 5:
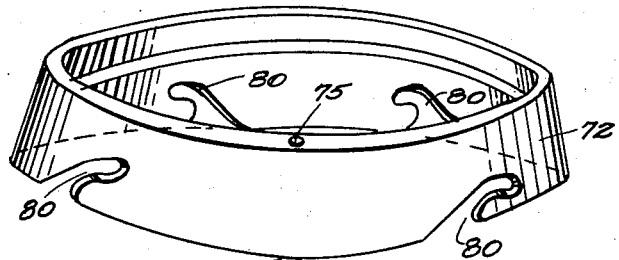
Fig. 5 is an enlarged detail view of a member which may be employed in another embodiment of the invention.

The signal flare 20 further includes a mounting ring 71 which is affixed to the housing 21 at the lower portion of the conical section 23 thereof, as best illustrated in Figs. 9 and 10. The mounting ring 71, which is shown in full detail in Fig. 6, is interlocked with a base ring 72 which forms the base of an inflatable envelope 73, the envelope 73 being disposed in encompassing relation to the upper part of the flare housing. The base ring is shown in enlarged detail in Fig. 5. A conduit 75 is incorporated in the base ring 72 of the envelope as indicated in Figs. 5, 9 and 11 and is utilized to inflate the envelope 73. A suitable valve closure member 76 is provided for the conduit 75 and may be of any desired form capable of hermetically sealing the conduit from the atmosphere. Preferably, a sealing ring or gasket 77 (see Figs. 6, 9 and 10) is interposed between the two rings 71 and 72 to assure a complete air tight seal for the envelope 73. The base ring 72 is provided with a series of slots 80 at regular intervals about the periphery thereof. These slots are engaged by a corresponding series of pins 83 on the mounting ring 71 which engage in the slots to secure the two rings together. It should be understood that this construction is merely exemplary and that any other mounting arrangement suitable for sealing the envelope 73 on the flare may be employed, including the construction described in U.S. Patent No. 2,619,303, issued November 25, 1952 to Harry M. Martin, one of the co-inventors herein.

The envelope 73 may be formed from rubber, a rubber composition, or from a plastic material which is substantially impermeable to air and other fluids. The material selected for this purpose must be substantially translucent when the envelope is inflated in order to permit light radiated through the flare dome 24 to be seen from outside the envelope.

The signal flare 70 further includes a transmitter 80 which is disposed within the housing 21 of the main flare body and which is electrically connected to an antenna disposed within the housing 21 and illustrated as a coil antenna 81. For example, the transmitter 80 may comprise a simple oscillator and an amplifier of one or more stages driven by the oscillator and coupled to the antenna coil 81. The transmitter 80 is connected to the battery by the conductors 38 and 39 which also serve, as in the previously described embodiment, to connect the battery to the flare circuit 36.

Operationally, the embodiment of Figs. 5–11 is in many respects quite similar to that of Figs. 1–3. The flare is maintained in inactive condition under normal circumstances by means of the removable base 45 which engages the switch actuating member 43 and maintains the switch in open condition. In this instance, the switch 42 is incorporated in the energizing circuit for the transmitter 80 as well as in the operating circuit for the flashtube of the flare; if necessary, a multi-pole switch may be employed for this purpose. The flare may be stored with the envelope 73 uninflated. When it is desired to use the flare, the closure member 76 is removed and the conduit 75 is connected to and inflated from a source of helium, hydrogen, or other lighter-than-air gas (not shown). Helium is of course preferred because it presents no explosion or fire hazard.

With the envelope inflated, the flare is ready for operation and may be actuated simply by removing the base member 45 just as in the previously described embodiment. Removal of the base member permits the switch 42 to close, energizing both the transmitter 80 and the flashtube operating circuit 36. The flare emits a diffused but intense light signal, through the envelope 73, in essentially the same manner as the flare 20 of Fig. 1. At the same time, the signal device 70 emits an electromagnetic or radio signal from the antenna 81. This radio signal may be sensed by conventional directional receiving equipment and may assist materially in location of the distressed persons using the flare.

In the embodiment of Fig. 7, the flare is provided with one or more anchoring eyelets 90 which may be utilized to moor the flare at a desired location as indicated by the mooring line 91. In this embodiment, in order to avoid interference with the balloon portion of the flare, the anchoring member or members 90 are located on the upper portion of the base section 22 of the flare housing. It will of course be recognized that this anchoring arrangement may be changed substantially without departing from the inventive concept but that some means of mooring the flare of Fig. 7 is essential when the envelope 73 is inflated to make the overall flare structure lighter than air.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material encompassing said battery, said flashtube, and said circuit means, the portion of said housing encompassing said flashtube being of light-transmissive material; an actuating switch, mounted within said housing and electrically connected to said circuit means to disable said circuit means until said switch is actuated, said switch including an actuating member accessible externally of said housing; and a shock-absorbing packing interposed between said housing and said battery, said switch, and said circuit means.

2. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material encompassing said battery, said flashtube, and said circuit means, the portion of said housing encompassing said flashtube being of light-transmissive material; an actuating switch, mounted within said housing and electrically connected to said circuit means to disable said circuit means until said switch is actuated, said switch including an actuating member accessible externally of said housing; a shock-absorbing packing interposed between said housing and said battery, said switch, and said circuit means; and a phosphorescent coating on the external surface of said housing.

3. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material comprising resin-impregnated fiberglass encompassing said battery, said flashtube, and said circuit means, the portion of said housing encompassing said flashtube being substantially transparent; an actuating switch, mounted within said housing and electrically connected to said circuit means to disable said circuit means until said switch is actuated, said switch including an actuating member accessible externally of said housing; and a shock-absorbing packing interposed between said housing and said battery, said switch, and said circuit means.

4. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material encompassing said battery, said flashtube, and said circuit means, the portion of said housing encompassing said flashtube being of light-transmissive material; an actuating switch, mounted within said housing and electrically connected to said circuit means to disable said circuit means until said switch is actuated, said switch including an actuating member accessible externally of said housing; and a shock-absorbing packing interposed between said housing and said battery, said switch, and said circuit means, said packing comprising a plurality of blocks of foamed resinous plastic material.

5. A signal flare comprising: a battery; a high-output flashtube; circuit means, connected to said battery and said flashtube, for automatically intermittently completing an electrical circuit from said battery to said flashtube to energize said flashtube; an electromagnetic signal transmitter; a housing of shock-resistant water-impervious electrically non-conductive material encompassing said battery, said flashtube, said circuit means, and said transmitter, the portion of said housing encompassing said flashtube being of light-transmissive material; an actuating switch, mounted within said housing and electrically connected to said circuit means and to said transmitter to disable said circuit means and said transmitter until said switch is actuated, said switch including an actuating member accessible externally of said housing; and a shock-absorbing packing interposed between said housing and said battery, said switch, said circuit means, and said transmitter.

6. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material encompassing said battery, said flashtube, and said circuit means, said battery being disposed within the base of said housing and said flashtube within the top portion thereof with said circuit means interposed between said battery and said flashtube, the top portion of said housing being of light-transmissive material; an actuating switch, mounted within the base of said housing adjacent said battery and electrically connected to said circuit means to disable said circuit means until said switch is actuated, said switch including an actuating member accessible externally of said housing; and a shock-absorbing packing interposed between said housing and said battery, said switch, and said circuit means.

7. A signal flare comprising: a battery; a high-output flashtube; circuit means, connected to said battery and said flashtube, for automatically intermittently completing an electrical circuit from said battery to said flashtube to energize said flashtube; a housing of shock-resistant water-impervious material encompassing said battery, said flashtube, and said circuit means, the portion of said housing encompassing said flashtube being of light-transmissive material; an actuating switch, mounted within said housing and electrically connected to said circuit means to disable said circuit means until said switch is actuated, said switch including an actuating member accessible externally of said housing; a shock-absorbing packing interposed between said housing and said battery, said switch, and said circuit means; and a translucent inflatable envelope affixed to said housing in encompassing relation to said light-transmissive portion of said housing.

8. A signal flare comprising: a housing of shock-resistant water-impervious material having a base portion and a top portion, said top portion being of light-transmissive material; a battery, mounted within the base portion of said housing; a high-output flashtube disposed within the top portion of said housing; circuit means, mounted within said base housing and electrically connected to said battery and to said flashtube, for automatically intermittently completing an electrical circuit from said battery to said flashtube to energize said flashtube; an actuating switch, electrically connected to said circuit means, for disabling said circuit means until said switch is actuated, said switch including an actuating member accessible externally of said housing; a shock-absorbing packing interposed between said housing and said battery and said circuit means; and a base member, removably secured to said base portion of said housing and engaging said switch actuating member to maintain said switch in unactuated condition until said base member is removed from said housing.

9. A signal flare comprising: a housing of shock-resistant water-impervious material having a substantially cylindrical base portion, a conical intermediate portion; and a dome-like top portion, said top portion being of light-transmissive material; a battery, mounted within the base portion of said housing; a high-output flashtube disposed within the top portion of said housing; circuit means, mounted within the intermediate portion of said housing and electrically connected to said battery and to said flashtube, for automatically intermittently completing an electrical circuit from said battery to said flashtube to energize said flashtube; an actuating switch, electrically connected to said circuit means, for disabling said circuit means until said switch is actuated, said switch including an actuating member acessible externally of said housing; a shock-absorbing packing interposed between said housing and said battery and said circuit means; and a base member, removably secured to said base portion of said housing and engaging said switch actuating member to maintain said switch in unactuated condition until said base member is removed from said housing.

10. A signal flare comprising: a battery; a high-output flashtube; circuit means, connected to said battery and said flashtube, for automatically intermittently completing an electrical circuit from said battery to said flashtube to energize said flashtube, said circuit means comprising a trigger transformer having a secondary winding connected to said flashtube, a capacitor connected across said battery, and a thyratron having its discharge path connected in series with the primary winding of said transformer across said battery; a housing of shock-resistant water-impervious material encompassing said battery, said flashtube, and said circuit means, the portion of said housing encompassing said flashtube being of light-transmissive material; and actuating switch, mounted within said housing and electrically connected to said circuit means to disable said circuit means until said switch is actuated, said switch including an actuating member accessible externally of said housing; and a shock-absorbing packing interposed between said housing and said battery, said switch, and said circuit means.

11. A signal flare comprising: a battery; a gas filled high-output flashtube having an anode, a cathode, and a trigger electrode; circuit means, connected to said battery and said flashtube, for automatically intermittently completing an electrical circuit from said battery to said flashtube to energize said flashtube, said circuit means comprising a pair of conductors connecting said flashtube anode and cathode to the positive and negative terminals of said battery, a discharge capacitor connected across said terminals, a trigger transformer having a primary winding and further having a secondary winding connected to said flashtube trigger electrode, and a thyratron having a cathode connected to said transformer primary and an anode and control electrode connected to the positive terminal of said battery; a housing of shock-resistant water-impervious material encompassing said battery, said flashtube, and said circuit means, the portion of said housing encompassing said flashtube being of light-transmissive material; an actuating switch, mounted within said housing and electrically connected to said circuit means to disable said circuit means until said switch is actuated, said switch including an actuating member accessible externally of said housing; and a shock-absorbing packing interposed between said housing and said battery, said switch, and said circuit means.

References Cited in the file of this patent

UNITED STATES PATENTS

| | | |
|---|---|---|
| 2,006,737 | Gessford | July 2, 1935 |
| 2,201,166 | Germeshausen | May 21, 1940 |
| 2,342,257 | Edgerton | Feb. 22, 1944 |
| 2,478,901 | Edgerton | Aug. 16, 1949 |
| 2,492,837 | Briggs | Dec. 27, 1949 |
| 2,800,601 | Martin | July 23, 1957 |

OTHER REFERENCES

"Electronic Preserves," P. J. Franklin and M. Weinberg Scientific American, December, 1947, pages 258, 259, 260.

"Potted Subassemblies for Submarine Equipment," T. W. Tuller, Electronics, September, 1949, pages 104, 105.